May 21, 1946.  B. L. BINFORD  2,400,479
FLOW RESPONSIVE DEVICE
Filed July 2, 1943  2 Sheets-Sheet 1

Inventor
Benjamin L. Binford
By Thiess, Olson & Mecklenburger
Attys

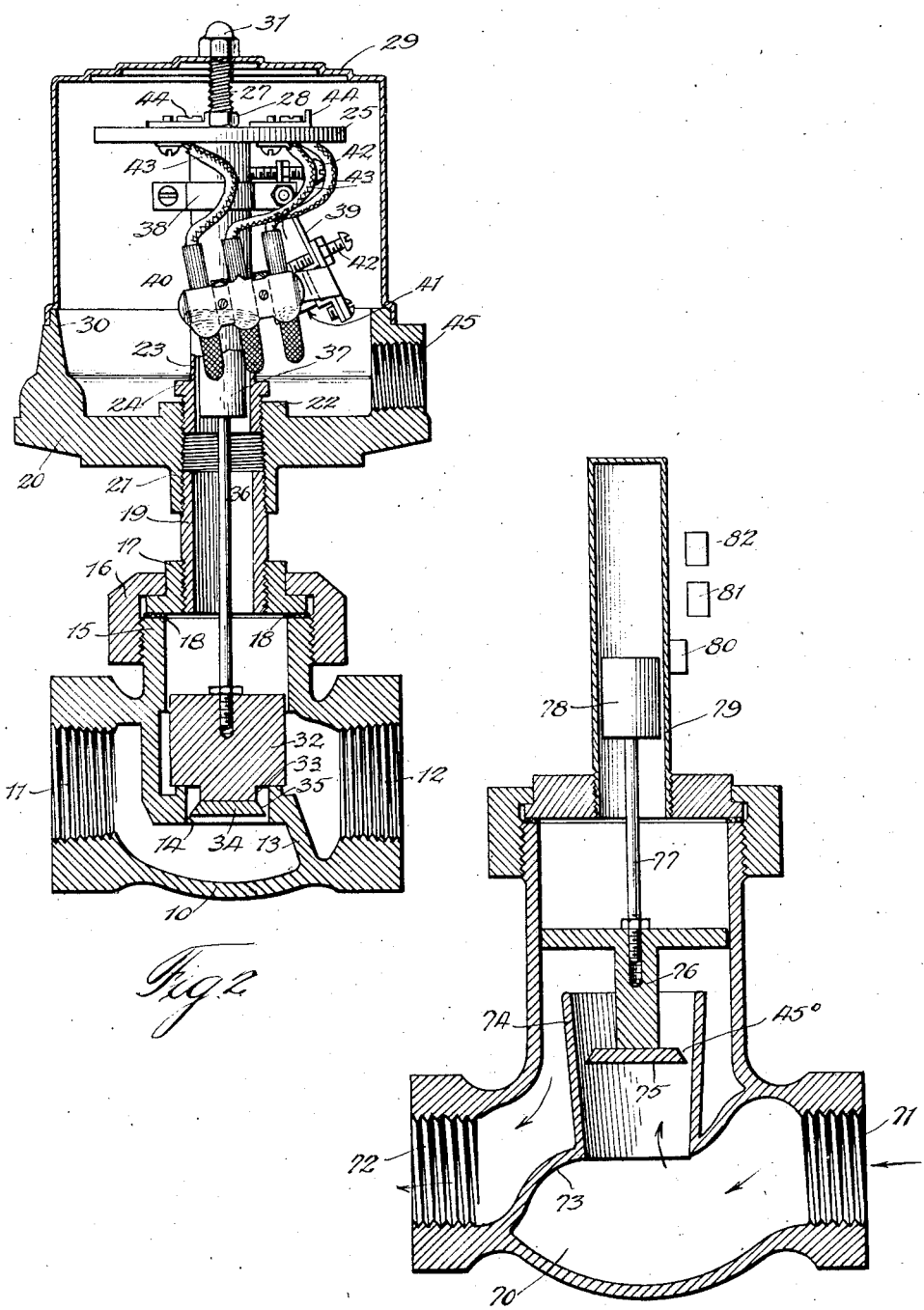

Patented May 21, 1946

2,400,479

UNITED STATES PATENT OFFICE 2,400,479

FLOW RESPONSIVE DEVICE

Benjamin L. Binford, Chicago, Ill., assignor to Fred H. Schaub Engineering Co., Chicago, Ill., a corporation of Illinois Application July 2, 1943, Serial No. 493,249

8 Claims. (Cl. 200—81.9)

This invention relates to flow responsive devices for effecting control signal or recording functions such as the operation of flow control circuits, signal lights, recorders, audible alarms or the like, in response to predetermined rates of flow of fluids, and the invention has for an object the provision of improved devices of this character.

Flow alarms or flow responsive devices of various types have heretofore been provided, but have not been entirely satisfactory due to difficulties encountered and limitations involved in the application of such devices to different operating conditions. For example, in liquid flow responsive devices the inability of such devices to operate with liquids of different viscosities is highly objectionable. Furthermore, the tendency of fluid flow responsive devices to respond to static pressure of the fluid rather than to the rate of flow only, and the difficulties of preventing leakage under pressure, indicate that something is yet to be desired in a reliable, inexpensive and rugged flow responsive device. It is accordingly a further object of the invention to provide a flow responsive device which reliably and accurately indicates predetermined rates of flow regardless of the static pressures existing in the flowing fluids, or the viscosity of flowing liquids, which comprises only a few easily fabricated parts and which is at all times positively sealed against leakage.

In carrying out the invention in one form, a chamber is provided having an inlet and an outlet and having means disposed between said inlet and outlet formed to provide a throat through which the liquid flows in passing from the inlet to the outlet. Mounted for axial movement into and out of the throat is a flow responsive disc having an external diameter less than the internal diameter of the throat, and having a sharp peripheral edge which forms with the throat an annular orifice. The flow of fluid through the throat effects movements of the disc which are a function of the rate of flow of the fluid and substantially independent of the viscosity, so that control means associated with the disc are operated in response to predetermined rates of flow.

More particularly, the disc is mounted on a piston element arranged in the chamber so that all surfaces of the piston and disc are subjected to fluid pressure, thereby rendering the disc and piston independent of the static pressure of the fluid in the chamer. The face of the disc adjacent the inlet side of the throat is preferably substantially flat, and the opposed surface thereof is tapered at an angle of approximately 45° so as to meet the flat surface in the desired sharp peripheral edge.

In one embodiment of the invention the chamber may be provided with a second throat or aperture, the capacity of which may be manually adjusted so as to by-pass around the throat containing the flow responsive disc any desired quantity of fluid, whereupon the disc and the control means operated thereby will respond only to rates of flow in excess of the capacity of the manually adjustable throat or aperture. In a still further embodiment of the invention, the throat may be of elongated tapered form so that as the disc moves outwardly therein, away from the inlet side of the throat, the orifice will gradually increase in width thereby requiring greater rates of flow to effect further movement of the disc. A plurality of control means are associated with the disc in this embodiment of the invention, which control means are adapted to be sequentially operated by progressive movement of the disc along the tapered throat in response to the predetermined rates of flow therethrough.

For a more complete understanding of the invention, reference should now be had to the drawings in which:

Fig. 2 is a sectional elevational view of the flow responsive device shown in Fig. 1, the section being taken substantially along the vertical centerline of the device;

Fig. 4 is a similar sectional elevational view, illustrating somewhat diagrammatically a still further embodiment of the invention.

Figure 1:
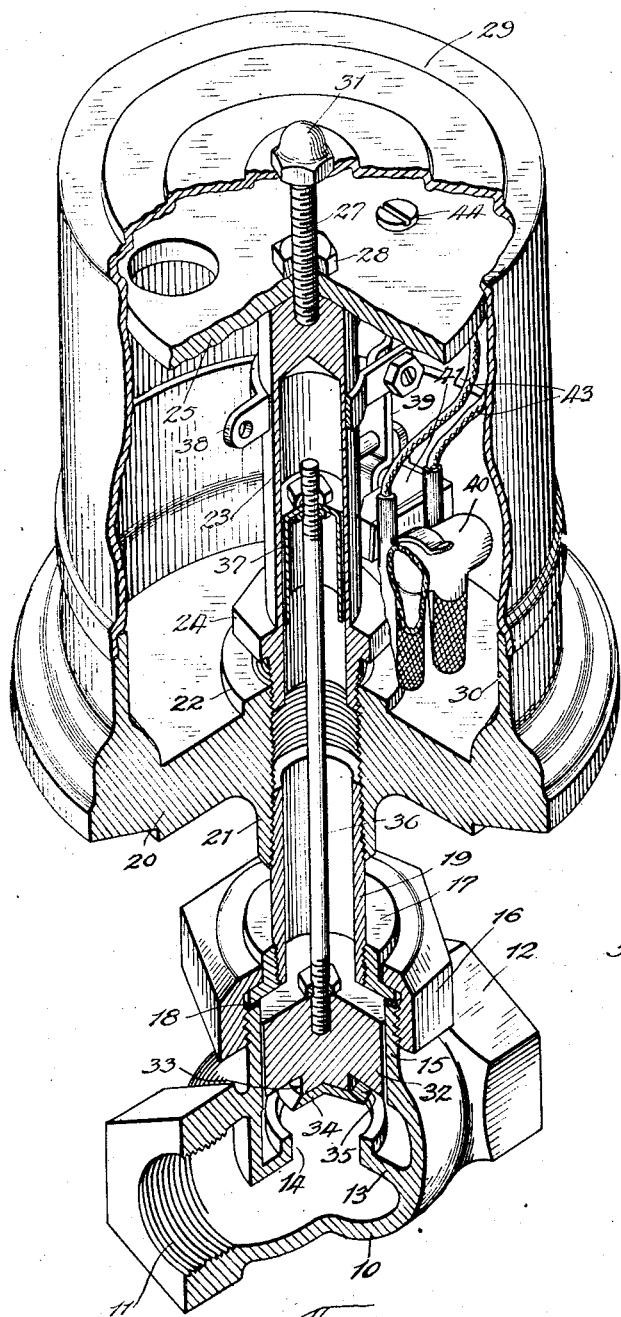
Fig. 1 is a somewhat diagrammatic perspective view of a flow responsive device embodying the present invention, a segment being cut away to illustrate the internal structure.

Referring now to Figs. 1 and 2 of the drawings, the flow responsive device comprises a chamber or body 10 which is shown as comprising a standard valve body having an inlet 11 and an outlet 12. Interposed between the inlet and the outlet of the chamber 10 is a wall 13 which is apertured, as shown, to provide a throat 14. Immediately above the throat 14 the chamber 10 is provided with a cylindrical extension 15 which is externally threaded, as shown, to receive a cap nut 16 by means of which a closure member 17 is secured to the upper end of the extension 15, a suitable gasket 18 being provided for sealing purposes.

The closure member 17 is centrally apertured and threaded, as shown, to receive in threaded relation an upstanding tubular post 18, the upper end of which is externally threaded for supporting the base portion 20 of a control or switching chamber. As shown, the base portion 20 is provided with a downwardly extending central boss 21 which is internally threaded to receive the threaded upper end of the post 18. A second boss 22 on the upper side of the base 20 is likewise threaded for receiving a tubular element 23 which is formed of suitable nonmagnetic material, such as brass or a suitable stainless steel. The tubular element 23 is provided adjacent its lower end with an extending portion 24 which is shaped to provide a nut, so that by means of a suitable wrench the threaded end of the tubular member 23 may be tightened in the threaded boss 22 of the base 20.

Supported on the closed upper end of the tubular member 23 is an insulating plate 25 which supports the terminals for the switch or control mechanism to be hereinafter described, and, as shown in Fig. 1, the closed upper end of the tubular element 23 is drilled and threaded to receive a threaded post 27 which extends through the insulating plate 25 and carries a nut 28 by means of which the insulating plate 25 is rigidly secured in position. The upper end of the threaded post 27 extends through a suitable aperture in the upper wall of a cover member 29, which as shown is substantially cup-shaped and arranged to engage at its lower edge an upstanding flange 30 on the base 20. A suitable nut 31 is provided for engaging the extending upper end of the post 27 so as to secure the cover member 29 in position on the base member 20.

It will now be seen that the tubular members 19 and 23, in co-operation with the base member 20, the closure member 17 and the cylindrical extension 15, form a tubular chamber extending outwardly from and in communication with the chamber 10, which extending chamber is sealed against any possibility of leakage.

Disposed within the flow chamber 10 on the side of the throat 14 adjacent the outlet 12 is a piston 32, the lower end of which is provided with an extending neck portion 33 to which is secured a disc 34 having a substantially flat lower surface facing the inlet side of the throat 14 and having a tapered peripheral surface 35 which meets the flat lower surface in a sharp peripheral edge. The disc 34 has an external diameter less than the internal diameter of the throat 14, so that a sharp-edged orifice is provided through which liquid may flow in passing from the inlet 11 to the outlet 12. Extending from the upper surface of the piston 32 is a rod 36 which extends through the tubular chamber formed by the elements 19 and 23, and, as shown best in Fig. 1, the rod 36 carries at its upper end a magnetizable body which is in the form of a hollow inverted cup 37. The cup 37 may be formed of any suitable magnetizable material such as chrome steel. Whenever the disc 34 and the piston 32 move relative to the throat 14 in the chamber 10, the magnetizable body 37 will be correspondingly moved within the tubular member 23, and this movement of the magnetizable body is effective, in a manner now to be described, to operate suitable control or alarm means.

Secured to the tubular member 23 adjacent the upper end thereof is a clamp 38 on which is pivotally mounted a switch supporting arm or cradle 39 on which is carried an electric switch 40 which is shown in the drawings as being a well known mercury-to-mercury contact type of tilting switch. The arm or cradle also carries a permanent magnet 41 which may be formed of any suitable permanent magnet material, and the entire pivoted structure comprising the arm 39, the switch 40 and the magnet 41 is so balanced that it will normally occupy the position shown in Fig. 2, with the magnet 41 in spaced relation to the tubular member 23. Suitable adjusting means 42, in the form of screws may be provided for adjusting the travel of the pivoted arm 39, and it will be apparent that whenever the magnetizable body 37 moves along the interior of the hollow element 23 to a position within the field created by the permanent magnet 41, the magnetic force between the magnet and the body 37 will cause the magnet 41 to move inwardly and operate the pivoted arm 39 to the position shown in Fig. 1 in which position the switch 40 will be tilted so as to alter the circuit connections established by the switch. As shown, the contacts of the switch 40 are connected by suitable conductors 43 to terminals 44 carried on the insulating plate 25. These terminals may of course be connected by other suitable conductors (not shown) to any suitable control apparatus, alarm, recorder or signal device, and the base 20 of the switch housing is provided with a threaded opening 45 through which these additional conductors may extend for connection to the alarm or signal device. The switch 40 thus constitutes control means which may be employed to effect operation of any desired flow controlling means, signal device alarm, recorder or any combinations thereof depending upon the requirements of the installation.

In Fig. 2 the flow responsive device is shown with the piston 32 and disc 34 in their lowermost positions corresponding to a condition of zero flow through the chamber 10. As soon as liquid begins to flow through the inlet 11 of the chamber 10, a static pressure will build up on the inlet side of the throat sufficient to raise the piston 32 slightly and permit flow through the throat 14. As shown, sufficient clearance is provided between the piston 32 and the cylindrical extension 15 so that liquid may enter the extension, and thus all surfaces of the piston 32 and the disc 34 will be subjected to the static pressure of the liquid. Consequently, the piston and disc, after the initial opening of the throat to permit flow therethrough, will not be affected by static pressure but will operate solely in response to the rate of flow.

It will of course be understood that the flow of liquid through the orifice defined by the disc and the throat, creates a pressure drop depending upon the rate of flow, and as soon as this pressure drop becomes sufficiently great to overcome the weight of the piston and the parts carried thereby the piston and disc will move upwardly toward the position shown in Fig. 1. As heretofore pointed out, as soon as the magnetizable body 37 which is carried by the piston 32 enters the magnetic field of the magnet 41, the switch 40 will be operated to change its circuit connections and effect operation of a suitable control or signal means. Upon a reduction of the rate of flow below the critical value, the piston and disc will again move downwardly toward the position shown in Fig. 2, and when the magnetizable body 37 moves out of the field of the magnet 41 the pivoted arm 39 will return to the position shown in Fig. 2 so as to again vary the circuit connections established by the switch 40.

The rate of flow at which the disc and piston will be operated depends not only on the weight of the piston, disc and associated parts, but also on the diameter of the throat and the width of the orifice defined by the disc and throat, and it has been found that in all cases a differential operation will be obtained. For example, if the various parts are so proportioned that the disc and piston will be raised sufficiently to operate the switch 40 from the position shown in Fig. 2 to the position shown in Fig. 1 at a flow rate of approximately three gallons per minute, the switch 40 will be maintained in this position until the rate of flow has decreased to a value considerably under three gallons per minute, for example two and three tenths gallons per minute. The extent of the differential of course depends upon the same factors as the initial operation, i. e., the weight of the piston, the diameter of the throat, and the width of the orifice.

By forming the disc with a tapered rear surface so as to provide a sharp peripheral edge, the flow responsive device is rendered substantially independent of the viscosity of the liquid flowing through the chamber 10. Preferably the tapered surface 35 extends at an angle of approximately 45°, and this particular angle has been found to substantially eliminate the effects of viscosity. Although the disc 34 is shown in Figs. 1 and 2 as being formed as a separate piece secured to the neck 33 on the piston 32, it will of course be understood that the piston and disc may be integrally formed if desired.

Figure 3:
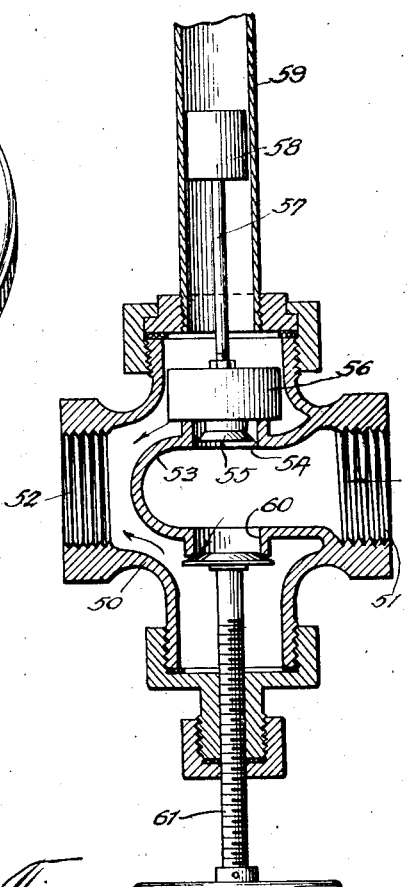
Fig. 3 is a fragmentary sectional elevational view similar to Fig. 1 showing another embodiment of the invention.

In the embodiment of the invention shown in Fig. 3, provision is made for indicating rates of flow much larger than would normally be indicated by the disc and piston construction therein shown. In Fig. 3 the flow chamber 50 is provided with an inlet 51, an outlet 52 and a separating wall 53 having a throat 54 therein similar to the corresponding parts shown in Figs. 1 and 2. Disposed in the throat 54 is a tapered flow disc 55 carried on a piston 56, which piston supports a rod 57 and a magnetizable body 58 in the same manner as heretofore described, the magnetizable body 58 being movable along a tube 59 formed of nonmagnetic material. It will of course be understood that control means or switching mechanism, including a permanent magnet and a tiltable switch similar to or identical with those shown in Figs. 1 and 2, will be associated with the nonmagnetic tube 59 for operation in response to the movements of the magnetizable body 58.

In addition, the wall 53 is provided with a second throat 60, and the flow through this second throat 60 may be controlled in any suitable manner. For example, there is shown in Fig. 3 a manually adjustable valve 61 which may be adjusted to open or close the throat 60 to any desired extent. It will be apparent that the throat 60 will by-pass a large portion of the fluid flowing through the chamber 50, the extent of the by-passing being determined by the adjustment of the valve 61, and the flow disc 55 in the throat 54 will respond only to the rates of flow in excess of the maximum rate for which the valve 61 is adjusted. Thus the flow disc 55 may be employed to indicate or control rates of flow considerably greater than the actual rate of flow through the throat 54.

In the embodiment of the invention shown in Fig. 4, the pressure chamber 70 is provided with an inlet 71 and an outlet 72, and the dividing wall 73 is provided with an elongated tapered or conical throat 74, in which a suitable flow disc 75 is mounted for movement. It will be apparent that as the flow disc 75 moves upwardly in the conical throat 74, the width of the orifice defined by the disc and the throat will gradually increase, and accordingly the disc may be employed to sequentially indicate a plurality of increasing rates of flow. As shown in Fig. 4, the disc 75 is mounted on a piston 76 which carries a rod 77 to the upper end of which is secured a magnetizable body 78. This magnetizable body moves within a nonmagnetic tube 79 in accordance with the movements of the disc 75, along the throat 74, and a plurality of control switches, diagrammatically indicated in Fig. 4 by the magnets 80, 81, and 82, are mounted on the tube 79 so as to operate in sequence as the magnetizable body 78 moves upwardly in the tube 79.

In the position shown in Fig. 4, the magnet 80 has been attracted so as to effect operation of the first control switch (not shown), and it will be apparent that as the body 78 moves upwardly from this position the magnet 81 will be attracted, and upon further movement the magnet 82 will be attracted. Of course, as the magnetizable body moves downwardly in the tube 79, the magnets will return to their original positions in reverse sequence.

While I have shown particular embodiments of my invention, it will be understood, of course, that I do not wish to be limited thereto, since many modifications may be made, and I, therefore, contemplate by the appended claims to cover any such modifications as fall within the true spirit and scope of my invention.

Having thus described my invention, what I claim and desire to secure by Letters Patent is:

1. A flow responsive device comprising a chamber having an inlet and an outlet and having a throat through which liquid flows in passing from said inlet to said outlet, a frusto-conical disc mounted for movement into and out of said throat along the axis thereof, said disc having a maximum diameter less than the internal diameter of said throat, the sharp peripheral edge of said disc forming with said throat an annular orifice, whereby a predetermined rate of flow of liquid through said throat effects movement of said disc out of said throat, said predetermined rate of flow being substantially independent of the viscosity of said liquid, and control means operable in response to said movement of said disc into and out of said throat.

2. A flow responsive device comprising a chamber having an inlet and an outlet and having a throat through which liquid flows in passing from said inlet to said outlet, a disc mounted for movement into and out of said throat along the axis thereof, said disc having a maximum diameter less than the internal diameter of said throat, and having a sloping surface meeting the opposite surface thereof in a sharp peripheral edge thereby to form with said throat an annular orifice, whereby a predetermined rate of flow of liquid through said throat effects axial movement of said disc out of said throat, said predetermined rate of flow being substantially independent of the viscosity of said liquid, and control means operable in response to said movement of said disc into and out of said throat.

3. A flow responsive device comprising a chamber having an inlet and an outlet and having a throat of substantially uniform diameter through which liquid flows in passing from said inlet to said outlet, a disc mounted for movement into and out of said throat along the axis thereof, said disc having an external diameter less than the internal diameter of said throat, and having a substantially flat surface facing the inlet side of said throat, the opposite surface of said disc including a portion inclined at an angle of approximately 45° to said flat surface and meeting said flat surface in a sharp peripheral edge, said edge and the wall of said throat forming an annular orifice whereby a predetermined rate of flow of liquid through said throat effects axial movement of said disc out of said throat, said predetermined rate of flow being substantially independent of the viscosity of said liquid, and magnetic control means operable in response to said movement of said disc into and out of said throat.

4. A flow responsive device comprising a flow chamber having an inlet and an outlet and having a throat through which liquid flows in passing from said inlet to said outlet, a disc having an external diameter less than the internal diameter of said throat, a piston mounted in said chamber for movement toward and away from said throat and axially thereof, means for mounting said disc on said piston for movement into and out of said throat, said disc and said throat providing an annular orifice, said disc and said piston having all of the external surfaces thereof subjected to the static pressure of the liquid in said chamber whereby movement of said disc into and out of said throat is effected solely by the rate of flow of liquid through said annular orifice, said disc having a substantially flat surface facing the inlet side of said throat and having an opposite surface sloped at substantially 45° to said flat surface so as to meet said flat surface in a sharp peripheral edge, and magnetic control means operable in response to movements of said disc into and out of said throat corresponding to predetermined rates of flow.

5. A flow responsive device comprising a flow chamber having an inlet and an outlet, a tube of non-magnetic material extending from said chamber and having a closed end, switch means pivotally mounted on the exterior of said tube for movement between open and closed circuit positions, said switch means including a magnet, a magnetizable body within said tube movable into and out of the field of said magnet for effecting operation of said switch means, means in said chamber forming a throat through which liquid flows in passing from said inlet to said outlet, a disc in said throat having an external diameter less than the internal diameter of said throat and having a sharp peripheral edge forming with said throat an annular orifice, and means connecting said disc to said magnetizable body for effecting movement of said body in said tube in accordance with the rate of flow of liquid through said throat, said sharp peripheral edge on said disc rendering the flow response of said disc substantially independent of the viscosity of the liquid.

6. A flow responsive device comprising a flow chamber having an inlet and an outlet, a tube of non-magnetic material extending from said chamber and having a closed end, switch means pivotally mounted on the exterior of said tube for movement between open and closed circuit positions, said switch means including a magnet, a magnetizable body within said tube movable into and out of the field of said magnet for effecting operation of said switch means, means in said chamber forming a throat through which liquid flows in passing from said inlet to said outlet, a disc in said throat having an external diameter less than the internal diameter of said throat and having a substantially flat face adjacent the inlet side of said throat, the opposite face of said disc including a portion inclined at substantially 45° and meeting said flat face in a sharp peripheral edge, and means connecting said disc to said magnetizable body for effecting movement of said body in said tube in accordance with the rate of flow of liquid through said throat, said sharp peripheral edge on said disc rendering the flow response of said disc substantially independent of the viscosity of the liquid.

7. A flow responsive device comprising a chamber having an inlet and an outlet and having a throat of substantially uniform diameter through which fluid flows in passing from said inlet to said outlet, a frusto-conical disc mounted for movement into and out of said throat along the axis thereof, said disc having an external diameter less than the internal diameter of said throat and having a sharp peripheral edge forming with said throat an annular orifice, whereby a predetermined rate of flow of liquid through said throat effects movement of said disc out of said throat, said predetermined rate of flow being substantially independent of the viscosity of said liquid, and magnetic control means operable in response to said movement of said disc into and out of said throat.

8. A flow responsive device comprising a flow chamber having an inlet and an outlet and a throat through which liquid flows in passing from said inlet to said outlet, a member movable within said chamber and comprising a piston portion and a disc portion, said disc portion having a substantially frusto-conical surface, the slant surface thereof terminating in a sharp peripheral edge; said disc adapted to occupy positions within and without said throat upon movement of said piston to provide an annular opening between said disc and throat, said disc and piston being adapted to present all of the external area thereof to the static pressure of said liquid in said chamber whereby movement of said disc into and out of said throat is effected solely by the rate of flow of liquid through said annular orifice and independently of the viscosity of said liquid, and control means operable in response to movements of said disc corresponding to predetermined rates of flow into and out of said throat.

BENJAMIN L. BINFORD.